US011974086B2

United States Patent
Li

(10) Patent No.: US 11,974,086 B2
(45) Date of Patent: Apr. 30, 2024

(54) EARPHONE CHARGING SYSTEM AND CHARGING METHOD THEREOF

(71) Applicant: Merry Electronics Co., Ltd., Taichung (TW)

(72) Inventor: Hung-Yuan Li, New Taipei (TW)

(73) Assignee: Merry Electronics Co., Ltd., Taichung (TW)

( * ) Notice: Subject to any disclaimer, the term of this patent is extended or adjusted under 35 U.S.C. 154(b) by 0 days.

(21) Appl. No.: 17/844,059

(22) Filed: Jun. 20, 2022

(65) Prior Publication Data

US 2023/0379614 A1 Nov. 23, 2023

(30) Foreign Application Priority Data

May 18, 2022 (TW) .................................. 111118491

(51) Int. Cl.
*H04R 1/10* (2006.01)
*H02J 7/00* (2006.01)
(52) U.S. Cl.
CPC ........ *H04R 1/1025* (2013.01); *H02J 7/00034* (2020.01); *H02J 7/0069* (2020.01); *H04R 2420/07* (2013.01)

(58) Field of Classification Search
CPC .............. H04R 1/1025; H04R 2420/07; H02J 7/00034; H02J 7/0069
See application file for complete search history.

(56) References Cited

U.S. PATENT DOCUMENTS

| | | | | |
|---|---|---|---|---|
| 2020/0321792 A1* | 10/2020 | Rhee | ...................... | H02J 7/0049 |
| 2021/0250063 A1* | 8/2021 | Kwon | ...................... | H04B 3/54 |
| 2021/0368256 A1* | 11/2021 | Liu | ...................... | H04R 1/1041 |
| 2022/0286768 A1* | 9/2022 | Chen | ...................... | H04R 1/1025 |
| 2022/0385085 A1* | 12/2022 | Jeon | ...................... | H04R 1/1025 |

* cited by examiner

Primary Examiner — Jason R Kurr
(74) Attorney, Agent, or Firm — JCIPRNET

(57) ABSTRACT

An earphone charging system and a charging method thereof are provided. A charging circuit of an earphone device converts an output voltage provided by a charging device into a charging voltage to charge an earphone battery when the output voltage is higher than a preset voltage. The earphone device or the charging device adjusts the output voltage to switch between a first voltage and a second voltage, so as to perform data transmission between the earphone device and the charging device, wherein the first voltage and the second voltage are higher than the preset voltage.

10 Claims, 5 Drawing Sheets

EARPHONE CHARGING SYSTEM AND CHARGING METHOD THEREOF

CROSS-REFERENCE TO RELATED APPLICATION

This application claims the priority benefit of Taiwan application serial no. 111118491, filed on May 18, 2022. The entirety of the above-mentioned patent application is hereby incorporated by reference herein and made a part of this specification.

BACKGROUND OF THE INVENTION

Field of the Invention

The invention relates to a charging device, and more particularly, to an earphone charging system and a charging method thereof.

Description of Related Art

Generally speaking, wireless earphones have a battery for supplying power needed for the operation of the wireless earphones. In addition, the wireless earphones usually come with a dedicated earphone charging case. The earphone charging case may be used to accommodate the wireless earphones and provide AC voltage. Therefore, the wireless earphones need to have a rectifier circuit to convert the AC voltage into a DC voltage to charge the battery of the wireless earphones. In addition, the earphone charging case enables one-way communication with the wireless earphones.

SUMMARY OF THE INVENTION

The invention provides an earphone charging system and a charging method thereof that may effectively reduce circuit cost and achieve two-way communication between a charging device and an earphone device.

An earphone charging system of the invention includes an earphone device and a charging device. The earphone device includes an earphone battery and a charging circuit. The charging circuit is coupled to the earphone battery and a signal input end of the earphone device. The charging device is used for accommodating and coupling the earphone device, and the charging device provides an output voltage. The charging circuit converts the output voltage into a charging voltage when the output voltage is higher than a preset voltage to charge the earphone battery, the earphone device or the charging device adjusts the output voltage to switch between a first voltage and a second voltage to perform data transmission between the earphone device and the charging device, and the first voltage and the second voltage are higher than the preset voltage.

In an embodiment of the invention, the earphone device includes a control circuit, a voltage adjustment circuit, and a sensing circuit. The control circuit is coupled to the charging circuit. The voltage adjustment circuit is coupled to the control circuit and the signal input end of the earphone device, and controlled by the control circuit to adjust the output voltage to transmit data provided by the control circuit. The sensing circuit is coupled to the control circuit and the signal input end of the earphone device, and senses the output voltage to generate a sensing signal, wherein the control circuit determines data transmitted by the charging device according to the sensing signal.

In an embodiment of the invention, the voltage adjustment circuit includes a resistor and a switch. The switch is connected in series with the resistor between the signal input end of the earphone device and a reference voltage, wherein the control circuit controls a conducting state of the switch to adjust the output voltage.

In an embodiment of the invention, the sensing circuit is a voltage divider circuit.

In an embodiment of the invention, the charging device includes a rechargeable battery, a DC-DC conversion circuit, a control circuit, a voltage adjustment circuit, and a sensing circuit. The rechargeable battery provides a DC voltage. The DC-DC conversion circuit is coupled to the rechargeable battery to convert the DC voltage into the output voltage. The control circuit is coupled to the DC-DC conversion circuit. The voltage adjustment circuit is coupled to the control circuit and a signal output end of the charging device, and controlled by the control circuit to adjust the output voltage to transmit data provided by the control circuit. The sensing circuit is coupled to the control circuit and the signal output end of the charging device, and senses the output voltage to generate a sensing signal, wherein the control circuit determines data transmitted by the earphone device according to the sensing signal.

In an embodiment of the invention, the voltage adjustment circuit includes a resistor and a switch. The switch is connected in parallel with the resistor between the DC-DC conversion circuit and the signal output end of the charging device, wherein the control circuit controls a conducting state of the switch to adjust the output voltage.

In an embodiment of the invention, the sensing circuit is a voltage divider circuit.

In an embodiment of the invention, the control circuit also controls the DC-DC conversion circuit to convert the DC voltage into a wake-up voltage during a wake-up period to wake up the earphone device, and the wake-up voltage is lower than the first voltage and the second voltage.

The invention further provides a charging method of an earphone charging system, wherein the earphone charging system includes an earphone device and a charging device, and the charging method of the earphone charging system includes the following steps. An output voltage is provided via the charging device. A charging voltage is provided via a charging circuit of the earphone device according to the output voltage to charge an earphone battery of the earphone device, wherein the charging circuit converts the output voltage to the charging voltage when the output voltage is higher than a preset voltage. The output voltage is adjusted to switch between a first voltage and a second voltage to perform data transmission between the earphone device and the charging device, wherein the first voltage and the second voltage are higher than the preset voltage.

In an embodiment of the invention, the charging method of the earphone charging system includes providing a wake-up voltage to the earphone device during a wake-up period via the charging device to wake up the earphone device, wherein the wake-up voltage is lower than the first voltage and the second voltage.

Based on the above, the charging circuit of the earphone device of an embodiment of the invention may convert the output voltage provided by the charging device into the charging voltage when the output voltage is higher than the preset voltage to charge the earphone battery, the earphone device or the charging device may adjust the output voltage to switch between the first voltage and the second voltage to perform data transmission between the earphone device and the charging device, and the first voltage and the second voltage are higher than the preset voltage. In this way, a rectifier circuit does not need to be additionally provided in the earphone device, and therefore circuit cost may be reduced, and two-way communication between the charging device and the earphone device may be achieved.

In order to make the aforementioned features and advantages of the disclosure more comprehensible, embodiments accompanied with figures are described in detail below.

DESCRIPTION OF THE EMBODIMENTS

Figure 1:
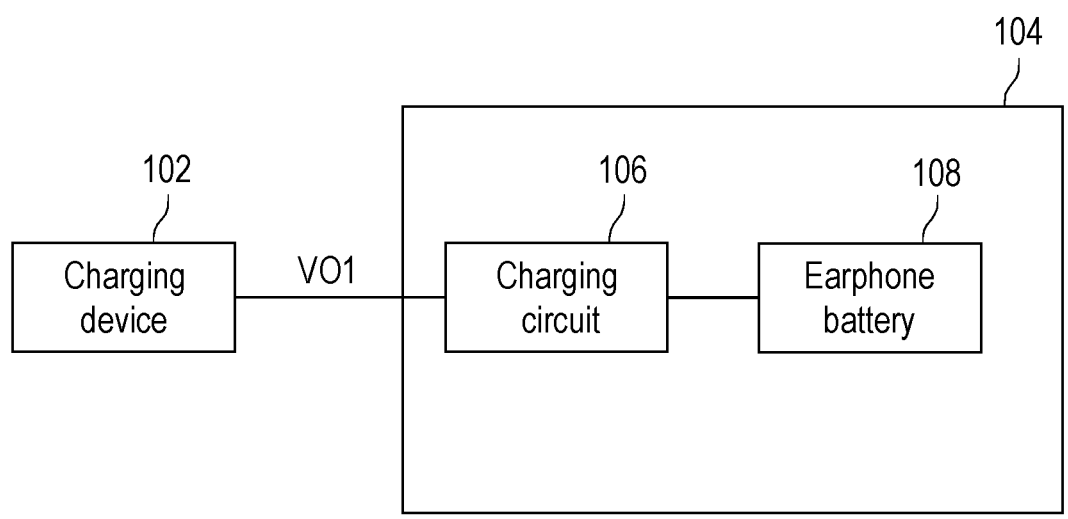
FIG. 1 is a schematic diagram of an earphone charging system according to an embodiment of the invention.

FIG. 1 is a schematic diagram of an earphone charging system according to an embodiment of the invention. Please refer to FIG. 1. The earphone charging system includes a charging device 102 and an earphone device 104. The charging device 102 is used for accommodating and coupling the earphone device 104, wherein the earphone device 104 may include a charging circuit 106 and an earphone battery 108. The charging circuit 106 is coupled to the signal input end of the earphone device 104 and the earphone battery 108. The earphone battery 108 may be, for example, a lithium-ion (Li-Ion) battery, a Li-polymer battery, or a nickel-metal hydride (NiMH) battery, but not limited thereto.

The charging device 102 may provide a DC output voltage VO1 to the earphone device 104 via a power transmission line or a spring connector (POGO pin), but not limited thereto. The charging circuit 106 of the earphone device 104 may convert the output voltage into a charging voltage to charge the earphone battery 108 when the output voltage VO1 is higher than a preset voltage. However, if the output voltage VO1 is not higher than the preset voltage, no charging voltage is provided to charge the earphone battery 108. The charging device 102 may switch between the first voltage and the second voltage by adjusting the output voltage VO1, so as to transmit a data signal to the earphone device 104. Similarly, the earphone device 104 may also switch between the first voltage and the second voltage by adjusting the output voltage VO1 to transmit the data signal to the charging device 102. In particular, the first voltage and the second voltage are higher than the preset voltage. That is, during the period when the charging device 102 or the earphone device 104 transmits the data signal, the charging circuit 106 may still provide the charging voltage to charge the earphone battery 108.

In this way, the DC output voltage VO1 of the charging device 102 is supplied to the earphone device 104, and during data transmission, the charging device 102 or the earphone device 104 adjusts the output voltage VO1 to switch between the first voltage and the second voltage. Therefore, there is no need to additionally provide a rectifier circuit in the earphone device 104, so that circuit cost may be reduced, and two-way communication between the charging device 102 and the earphone device 104 may be achieved.

Figure 2:
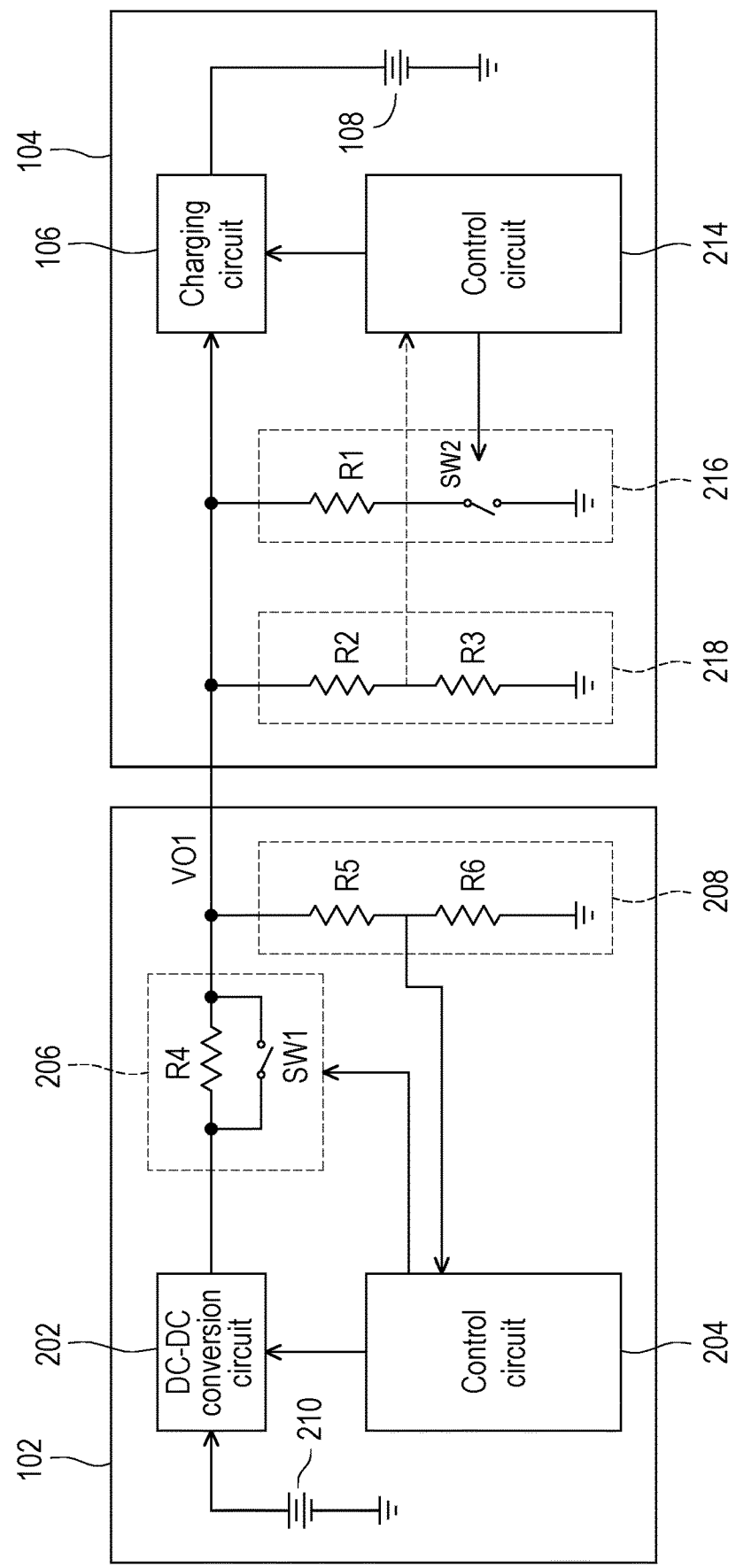
FIG. 2 is a schematic diagram of an earphone charging system according to another embodiment of the invention.

More specifically, the implementation of the earphone charging system may be shown in FIG. 2. In the embodiment of FIG. 2, the charging device 102 may include a DC-DC conversion circuit 202, a control circuit 204, a voltage adjustment circuit 206, a sensing circuit 208, and a rechargeable battery 210. The control circuit 204 is coupled to the DC-DC conversion circuit 202, the voltage adjustment circuit 206, and the sensing circuit 208, and the DC-DC conversion circuit 202 is coupled to the voltage adjustment circuit 206 and the rechargeable battery 210. The voltage adjustment circuit 206 is coupled to the signal output end of the charging device 102, and the sensing circuit 208 is coupled to the signal output end of the charging device 102. Moreover, in addition to the charging circuit 106 and the earphone battery 108, the earphone device 104 also includes a control circuit 214, a voltage adjustment circuit 216, and a sensing circuit 218, wherein the control circuit 214 is coupled to the charging circuit 106, the voltage adjustment circuit 216, and the sensing circuit 218, and the voltage adjustment circuit 216 and the sensing circuit 218 are coupled to the signal input end of the earphone device 104.

The rechargeable battery 210 may provide DC voltage to the DC-DC conversion circuit 202, so that the DC-DC conversion circuit 202 converts the DC voltage into the output voltage VO1, wherein the DC-DC conversion circuit 202 may be, for example, a booster circuit, but not limited thereto. The control circuit 204 may control the voltage adjustment circuit 206 to adjust the output voltage VO1 so as to transmit the data to be transmitted by the control circuit 204 to the earphone device 104. The voltage adjustment circuit 206 may include, for example, a resistor R4 and a switch SW1. The resistor R4 and the switch SW1 are connected in parallel between the DC-DC conversion circuit 202 and the signal output end of the charging device 102. The control circuit 204 controls the conducting state of the switch SW1 to adjust the output voltage VO1. For example, when the switch SW1 is in the off state, the output voltage VO1 is adjusted to the first voltage, and when the switch SW1 is in the on state, the output voltage VO1 is adjusted to the second voltage.

In the earphone device 104, the sensing circuit 218 may sense the voltage change of the output voltage VO1 to generate a corresponding sensing signal to the control circuit 214, and the control circuit 214 may determine the data transmitted by the charging device 102 according to the sensing signal. In particular, the sensing circuit 218 may be, for example, a voltage divider circuit. As shown in FIG. 2, the sensing circuit 218 may include, for example, resistors R2 and R3. The resistors R2 and R3 are connected in series between the signal input end of the earphone device 104 and the ground, and the sensing signal is generated on the common contact of the resistors R2 and R3.

Figure 3:
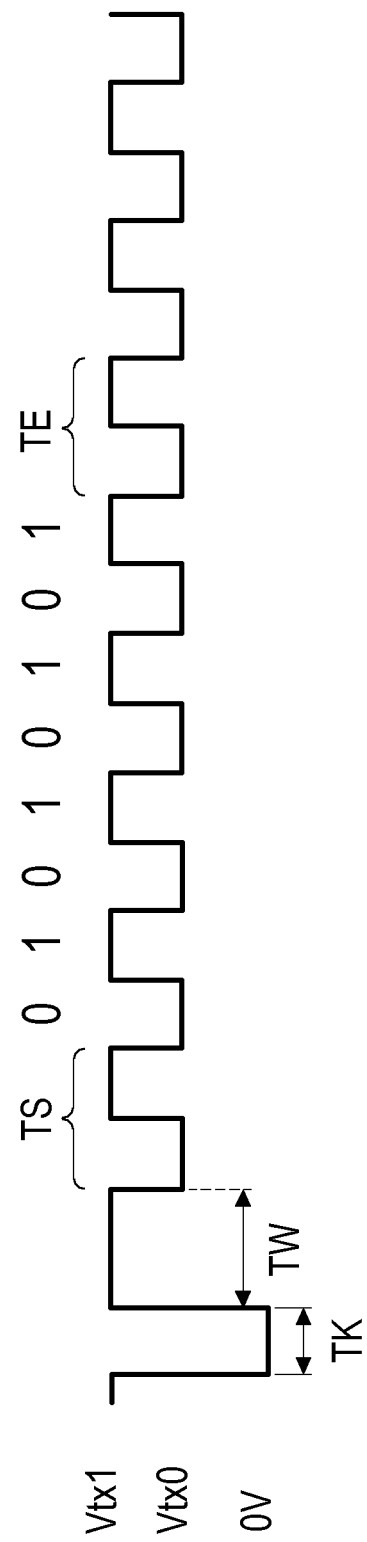
FIG. 3 is a schematic diagram of a data signal transmitted by a charging device according to an embodiment of the invention.

For example, the manner in which the charging device 102 transmits the data signal may be as shown in FIG. 3. When the charging device 102 needs to perform data transmission, the charging device 102 may first convert the output voltage VO1 to a wake-up voltage during a wake-up period TK (for example, the control circuit 214 may control the DC-DC conversion circuit 202 to convert the output voltage VO1 to the wake-up voltage) to wake up the earphone device 104, wherein the wake-up voltage is lower than the first voltage and the second voltage, and the wake-up voltage may be, for example, 0 volts, but not limited thereto. After the wake-up period TK ends, the charging device 102 starts to provide the output voltage VO1 to charge the earphone device 104, and after a waiting period TW, starts to perform data transmission at the preset data transmission rate. As shown in FIG. 3, the control circuit 204 may control the voltage adjustment circuit 206 to adjust the output voltage VO1 to switch between a first voltage Vtx0 and a second voltage Vtx1, wherein when the output voltage VO1 is adjusted to the first voltage Vtx0, the transmission data represented thereby is "0", and when the output voltage VO1 is adjusted to the second voltage Vtx1, the transmission data represented thereby is "1".

In the embodiment of FIG. 3, the control circuit 204 controls the voltage adjustment circuit 206 to adjust the output voltage VO1 to switch between the first voltage Vtx0 and the second voltage Vtx1 to provide transmission data "01010101" to the earphone device 104. Moreover, before transmission data "01010101" is provided, a preset data content (data "01" in the embodiment of FIG. 3, but not limited thereto) may be transmitted first during a start period TS to inform the earphone device 104 to start to perform data transmission. Moreover, after transmission data "01010101" is provided, an end period TE may be entered and the preset data content (data "01" in the embodiment of FIG. 3, but not limited thereto) may be transmitted to inform the earphone device 104 to end the data transmission. The data signal transmitted by the charging device 102 to the earphone device 104 may include, for example, an instruction inquiring about the power or the pairing status of the earphone device 104, an acknowledgment (ACK) signal, a negative acknowledgement (NACK), or an instruction to update the firmware, etc., but not limited thereto. The control circuit 214 may analyze and interpret the data signal transmitted by the charging device 102 and control the earphone device 104 to return the data signal to respond. When it is determined that the period during which the earphone device 104 does not receive the transmission data is longer than the preset period, the earphone device 104 may also be controlled to enter a standby mode or a sleep mode to wait for the charging device 102 to provide a wake-up voltage again.

Moreover, the voltage adjustment circuit 216 of the earphone device 104 may include, for example, a resistor R1 and a switch SW2. The resistor R1 and the switch SW2 are connected in series between the signal input end of the earphone device 104 and the ground, and the control circuit 214 may control the conducting state of the switch SW2 to adjust the output voltage VO1. For example, when the switch SW1 is in the on state, the output voltage VO1 is adjusted to the first voltage, and when the switch SW1 is in the off state, the output voltage VO1 is adjusted to the second voltage. The sensing circuit 208 of the charging device 102 may sense the voltage change of the output voltage VO1 to generate a corresponding sensing signal to the control circuit 204, and the control circuit 204 may determine the data transmitted by the earphone device 104 according to the sensing signal of the sensing circuit 208. In particular, the sensing circuit 208 may be, for example, a voltage divider circuit. As shown in FIG. 2, the sensing circuit 208 may include, for example, resistors R5 and R6. The resistors R5 and R6 are connected in series between the signal output end of the charging device 102 and the ground, and the sensing signal is generated on the common contact of the resistors R5 and R6.

Figure 4:
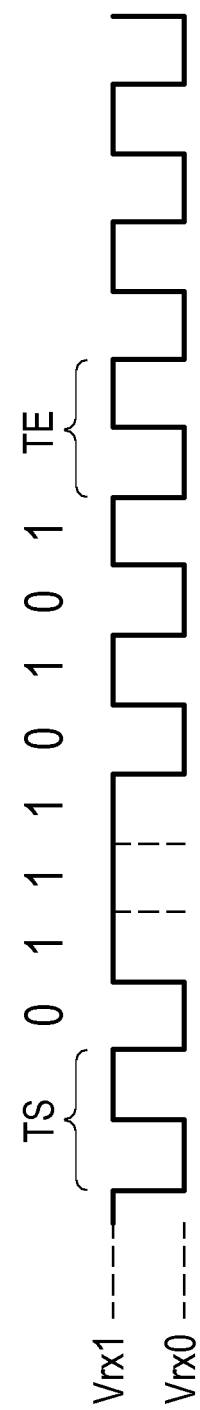
FIG. 4 is a schematic diagram of a data signal transmitted by an earphone device according to another embodiment of the invention.

For example, the manner in which the earphone device 104 transmits the data signal may be as shown in FIG. 4. When the earphone device 104 performs data transmission (for example, the control circuit 214 controls the earphone device 104 to transmit the data signal in response to the charging device 102 according to the instruction or request of the charging device 102), the control circuit 214 of the earphone device 104 may control the voltage adjustment circuit 216 to adjust the output voltage VO1 to switch between a first voltage Vrx0 and a second voltage Vrx1, wherein when the output voltage VO1 is adjusted to the first voltage Vrx0, the transmission data represented thereby is "0", and when the output voltage VO1 is adjusted to the second voltage Vrx1, the transmission data represented thereby is "1". Similar to the embodiment of FIG. 3, when the earphone device 104 performs data transmission, the earphone device 104 may first transmit a preset data content (data "01" in the embodiment of FIG. 4, but not limited thereto) during the start period TS to inform the charging device 102 to start to perform data transmission. Moreover, after the transmission data "01110101" is provided, the end period TE may be entered and the preset data content (data "01" in the embodiment of FIG. 3, but not limited thereto) may be transmitted to inform the charging device 102 to end the data transmission. The control circuit 204 of the charging device 102 may analyze and interpret the data signal transmitted by the earphone device 104, and control the charging device 102 to perform corresponding operations according to the analysis results, such as determining the corresponding charging mode according to the power of the earphone battery 108, but not limited thereto.

It should be mentioned that, the voltage value of the first voltage Vrx0 may be equal to the voltage value of the first voltage Vtx0, for example, and the voltage value of the second voltage Vrx1 may be equal to the voltage value of the second voltage Vtx1, for example, but not limited thereto. In some embodiments, the first voltage Vrx0, the first voltage Vtx0, the second voltage Vrx1, and the second voltage Vtx1 may also have different voltage values.

Figure 5:
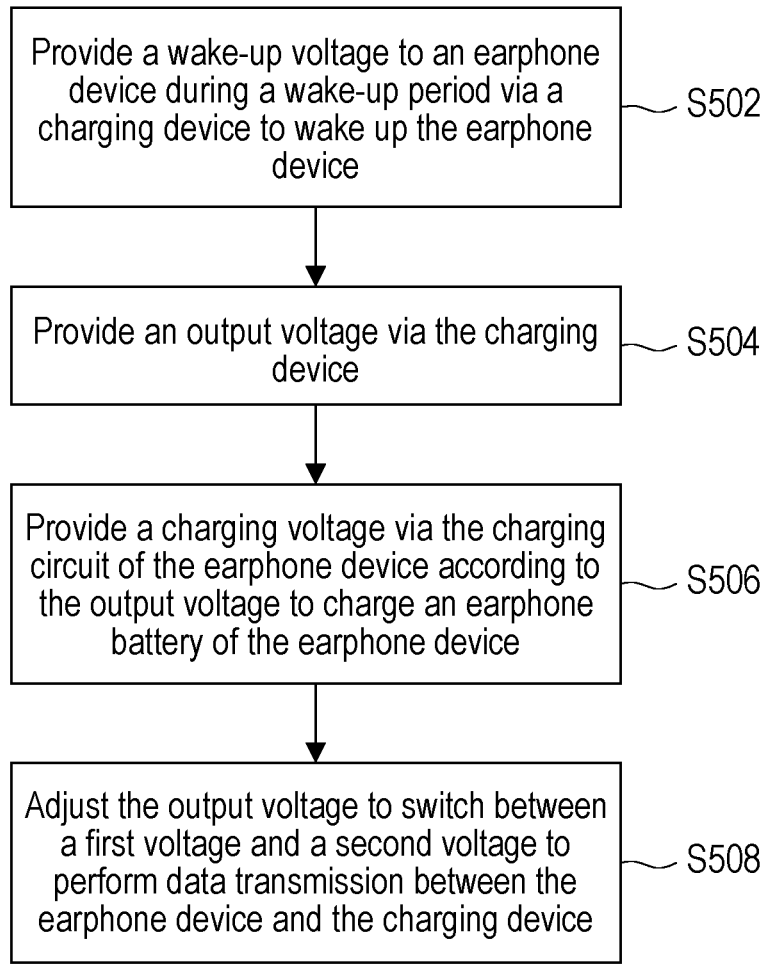
FIG. 5 is a flowchart of a charging method of an earphone charging system according to an embodiment of the invention.

FIG. 5 is a flowchart of a charging method of an earphone charging system according to an embodiment of the invention. It may be known from the above embodiments that the charging method of the earphone charging system may include the following steps. First, a wake-up voltage is provided to an earphone device via a charging device during a wake-up period to wake up the earphone device (step S502). Next, an output voltage is provided via the charging device (step S504). Then, a charging voltage is provided via a charging circuit of the earphone device according to the output voltage to charge an earphone battery of the earphone device (step S506), wherein the charging circuit converts the output voltage to the charging voltage when the output voltage is higher than a preset voltage. Next, the output voltage is adjusted to switch between a first voltage and a second voltage to perform data transmission between the earphone device and the charging device (step S508), wherein the first voltage and the second voltage are higher than the preset voltage. In addition, the wake-up voltage is lower than the first voltage and the second voltage. In some embodiments, step S502 may also be omitted.

Based on the above, the charging circuit of the earphone device of an embodiment of the invention may convert the output voltage provided by the charging device into the charging voltage when the output voltage is higher than the preset voltage to charge the earphone battery. The earphone device or the charging device may adjust the output voltage to switch between the first voltage and the second voltage to perform data transmission between the earphone device and the charging device, and the first voltage and the second voltage are higher than the preset voltage. In this way, a rectifier circuit does not need to be additionally provided in the earphone device, and therefore circuit cost may be reduced, and two-way communication between the charging device and the earphone device may be achieved.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An earphone charging system, comprising:
    an earphone device, wherein the earphone device comprises:
        an earphone battery; and
        a charging circuit coupled to the earphone battery and a signal input end of the earphone device; and
    a charging device for accommodating and coupling the earphone device to provide an output voltage, wherein the charging circuit converts the output voltage into a charging voltage when the output voltage is higher than a preset voltage to charge the earphone battery, the earphone device or the charging device adjusts the output voltage to switch between a first voltage and a second voltage to perform data transmission between the earphone device and the charging device while the earphone battery is charged by the charging voltage, and the first voltage and the second voltage are higher than the preset voltage.

2. The earphone charging system of claim 1, wherein the earphone device comprises:
    a control circuit coupled to the charging circuit;
    a voltage adjustment circuit coupled to the control circuit and the signal input end of the earphone device, and controlled by the control circuit to adjust the output voltage to transmit data provided by the control circuit; and
    a sensing circuit coupled to the control circuit and the signal input end of the earphone device, and sensing the output voltage to generate a sensing signal, wherein the control circuit determines data transmitted by the charging device according to the sensing signal.

3. The earphone charging system of claim 2, wherein the voltage adjustment circuit comprises:
    a resistor; and
    a switch connected in series with the resistor between the signal input end of the earphone device and a reference voltage, wherein the control circuit controls a conducting state of the switch to adjust the output voltage.

4. The earphone charging system of claim 2, wherein the sensing circuit is a voltage divider circuit.

5. The earphone charging system of claim 1, wherein the charging device comprises:
    a rechargeable battery providing a DC voltage;
    a DC-DC conversion circuit coupled to the rechargeable battery to convert the DC voltage into the output voltage;
    a control circuit coupled to the DC-DC conversion circuit;
    a voltage adjustment circuit coupled to the control circuit and a signal output end of the charging device, and controlled by the control circuit to adjust the output voltage to transmit data provided by the control circuit; and
    a sensing circuit coupled to the control circuit and the signal output end of the charging device, and sensing the output voltage to generate a sensing signal, wherein the control circuit determines data transmitted by the earphone device according to the sensing signal.

6. The earphone charging system of claim 5, wherein the voltage adjustment circuit comprises:
    a resistor; and
    a switch connected in parallel with the resistor between the DC-DC conversion circuit and the signal output end of the charging device, wherein the control circuit controls a conducting state of the switch to adjust the output voltage.

7. The earphone charging system of claim 5, wherein the sensing circuit is a voltage divider circuit.

8. The earphone charging system of claim 5, wherein the control circuit also controls the DC-DC conversion circuit to convert the DC voltage into a wake-up voltage during a wake-up period to wake up the earphone device, and the wake-up voltage is lower than the first voltage and the second voltage.

9. A charging method of an earphone charging system, wherein the earphone charging system comprises an earphone device and a charging device, and the charging method of the earphone charging system comprises:
    providing an output voltage via the charging device;
    providing a charging voltage via a charging circuit of the earphone device according to the output voltage to charge an earphone battery of the earphone device, wherein the charging circuit converts the output voltage to the charging voltage when the output voltage is higher than a preset voltage; and
    adjusting the output voltage to switch between a first voltage and a second voltage to perform data transmission between the earphone device and the charging device while the earphone battery is charged by the charging voltage, wherein the first voltage and the second voltage are higher than the preset voltage.

10. The charging method of the earphone charging system of claim 9, comprising:
    providing a wake-up voltage to the earphone device via the charging device during a wake-up period to wake up the earphone device, wherein the wake-up voltage is lower than the first voltage and the second voltage.

* * * * *